(12) United States Patent
Youssef

(10) Patent No.: US 8,181,442 B2
(45) Date of Patent: May 22, 2012

(54) GAS TURBINE AIRCRAFT ENGINE WITH POWER VARIABILITY

(75) Inventor: Nashed Youssef, Mississauga (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 828 days.

(21) Appl. No.: 12/114,962

(22) Filed: May 5, 2008

(65) Prior Publication Data

US 2009/0272121 A1    Nov. 5, 2009

(51) Int. Cl.
*F02K 3/02* (2006.01)
(52) U.S. Cl. ......... 60/226.1; 60/268; 60/802; 60/39.162
(58) Field of Classification Search ................ 60/226.1, 60/262, 268, 39.162, 788, 802
See application file for complete search history.

(56) References Cited

U.S. PATENT DOCUMENTS

| | | | | |
|---|---|---|---|---|
| 2,583,872 A | | 1/1952 | Newcomb | |
| 2,741,351 A | | 4/1956 | Fletcher et al. | |
| 2,804,748 A | | 9/1957 | Hutchinson | |
| 2,910,125 A | * | 10/1959 | Best | 416/28 |
| 2,931,442 A | * | 4/1960 | Stanton et al. | 416/37 |
| 2,933,893 A | * | 4/1960 | Blyth et al. | 60/791 |
| 2,936,978 A | * | 5/1960 | Lauck | 248/555 |
| 2,978,869 A | * | 4/1961 | Hiscock et al. | 60/802 |
| 2,996,883 A | * | 8/1961 | Fortmann | 60/39.281 |
| 3,037,347 A | * | 6/1962 | Leibach | 60/791 |
| 3,237,400 A | * | 3/1966 | Kuhrt | 60/246 |
| 3,292,449 A | * | 12/1966 | Eber et al. | 477/68 |
| 3,324,740 A | * | 6/1967 | Eber et al. | 477/68 |
| 3,518,023 A | * | 6/1970 | Britten et al. | 416/30 |
| 3,598,211 A | * | 8/1971 | Fergle | 477/30 |
| 3,729,957 A | * | 5/1973 | Petrie et al. | 60/226.1 |
| 4,037,409 A | | 7/1977 | Leibach | |
| 4,062,186 A | * | 12/1977 | Snow et al. | 60/226.1 |
| 4,163,366 A | * | 8/1979 | Kent | 60/226.1 |
| 4,251,987 A | | 2/1981 | Adamson | |
| 4,263,997 A | * | 4/1981 | Poore | 192/103 R |
| 4,446,696 A | * | 5/1984 | Sargisson et al. | 60/226.3 |
| 4,464,952 A | * | 8/1984 | Stubbs | 475/216 |
| 4,525,661 A | * | 6/1985 | Mucsy et al. | 322/4 |
| 4,700,590 A | * | 10/1987 | Omitsu | 477/49 |
| 4,742,683 A | * | 5/1988 | Heminghous et al. | 60/716 |
| 4,768,398 A | * | 9/1988 | Greenwood | 475/216 |
| 4,799,354 A | | 1/1989 | Midgley | |
| 4,831,898 A | * | 5/1989 | Miyawaki | 477/43 |
| 4,881,367 A | * | 11/1989 | Flatman | 60/785 |
| 4,996,839 A | * | 3/1991 | Wilkinson et al. | 60/247 |
| 5,010,729 A | * | 4/1991 | Adamson et al. | 60/226.1 |
| 5,012,646 A | * | 5/1991 | Speer | 60/728 |
| 5,015,898 A | * | 5/1991 | Frey | |
| 5,090,951 A | * | 2/1992 | Greenwood | 475/216 |
| 5,184,526 A | * | 2/1993 | Watanabe | 477/31 |
| 5,244,054 A | * | 9/1993 | Parry | 180/165 |
| 5,271,295 A | * | 12/1993 | Marnot | 74/665 B |
| 5,665,021 A | * | 9/1997 | Inoue | 476/4 |
| 5,782,433 A | * | 7/1998 | Goi et al. | 244/60 |
| 5,790,968 A | * | 8/1998 | Kashiwabara et al. | 701/51 |
| 5,967,927 A | * | 10/1999 | Imamura et al. | 475/83 |
| 6,035,629 A | * | 3/2000 | Hilgeman et al. | 60/773 |
| 6,042,499 A | * | 3/2000 | Goi et al. | 475/215 |

(Continued)

*Primary Examiner* — William H Rodriguez
(74) *Attorney, Agent, or Firm* — Norton Rose Canada LLP

(57) ABSTRACT

A gas turbine aircraft engine with power variability is provided. The gas turbine aircraft engine comprises a compressor and a turbine mounted on a common shaft, and, a continuously variable transmission coupled to the shaft for transmitting power to a propulsion load.

12 Claims, 3 Drawing Sheets

U.S. PATENT DOCUMENTS

| | | | |
|---|---|---|---|
| 6,336,878 B1 * | 1/2002 | Ehrlich et al. | 474/28 |
| 6,524,068 B2 * | 2/2003 | Carter, Jr. | 416/1 |
| 6,561,940 B2 * | 5/2003 | Goi et al. | 475/208 |
| 6,849,020 B2 * | 2/2005 | Sumi | 475/214 |
| 6,865,891 B2 * | 3/2005 | Walsh et al. | 60/792 |
| 6,895,741 B2 | 5/2005 | Rago et al. | |
| 6,932,739 B2 * | 8/2005 | Miyata et al. | 477/41 |
| 6,959,552 B2 * | 11/2005 | Leblanc | 60/772 |
| 7,028,461 B2 * | 4/2006 | Goi | 60/39.22 |
| 7,105,937 B2 * | 9/2006 | Hoppe et al. | 290/38 R |
| 7,115,066 B1 | 10/2006 | Lee | |
| 7,195,581 B2 * | 3/2007 | Segawa et al. | 477/180 |
| 7,204,781 B2 * | 4/2007 | Hiraku et al. | 475/312 |
| 7,297,084 B2 * | 11/2007 | Kimura et al. | 475/59 |
| 7,334,392 B2 * | 2/2008 | Moniz et al. | 60/204 |
| 7,363,757 B2 * | 4/2008 | Loisy | 60/226.1 |
| 7,481,396 B2 * | 1/2009 | Kish | 244/60 |
| 7,575,192 B1 * | 8/2009 | Kish | 244/60 |
| 7,654,927 B2 * | 2/2010 | Kimura et al. | 475/5 |
| 7,679,207 B2 * | 3/2010 | Cory | 290/44 |
| 7,802,757 B2 * | 9/2010 | Dooley et al. | 244/60 |
| 2002/0169047 A1 * | 11/2002 | Hiraku et al. | 475/206 |
| 2003/0106734 A1 * | 6/2003 | Nagai et al. | 180/233 |
| 2004/0033858 A1 * | 2/2004 | Sumi | 475/214 |
| 2005/0164818 A1 * | 7/2005 | Kimura et al. | 475/59 |
| 2006/0063632 A1 * | 3/2006 | Hiraku et al. | 475/214 |
| 2008/0274850 A1 * | 11/2008 | Kimura et al. | 475/52 |
| 2009/0286651 A1 * | 11/2009 | Tanaka et al. | 477/167 |
| 2010/0133813 A1 * | 6/2010 | Cote et al. | 290/32 |
| 2010/0207396 A1 * | 8/2010 | Simon | 290/55 |
| 2010/0308586 A1 * | 12/2010 | Frank et al. | 290/44 |
| 2011/0077118 A1 * | 3/2011 | Jones | 475/166 |
| 2011/0101693 A1 * | 5/2011 | Goi et al. | 290/46 |

* cited by examiner

US 8,181,442 B2

GAS TURBINE AIRCRAFT ENGINE WITH POWER VARIABILITY

TECHNICAL FIELD

The technical field relates generally to gas turbine engines and, more particularly, to a gas turbine aircraft engine with a continuous variable transmission.

BACKGROUND OF THE ART

Gas turbine aircraft engines are typically designed to operate most efficiently at one particular condition which comprises a relatively narrow range of rotational speed for the turbine and compressor combination. For single spool applications where the turbine and compressor are mounted on a common shaft and rotate at the same speed, the usefulness in terms of driving a propulsion load such as a propeller, a fan or propfan may be limited whether the propulsion load is driven directly or via a reduction gearbox. Since the operational speed range of the single spool turbine engine is relatively limited, the single spool turbine engine is not particularly suitable for varying the power delivered to the propulsion load which is normally required for smaller aircraft applications. Therefore, the single spool turbine engine has limited applications due to the restricted range of power variability available to the operator.

Accordingly, there is a need to provide a gas turbine aircraft engine with increased power variability.

SUMMARY

It is therefore an object to provide a gas turbine aircraft engine which addresses the above-mentioned concerns.

In one aspect, there is provided a gas turbine aircraft engine with power variability comprising:

a compressor and a turbine mounted on a common shaft; and a continuously variable transmission coupled to the shaft for transmitting power to a propulsion load.

In a second aspect, there is provided a single spool gas turbine aircraft engine comprising:

means for pressurizing air for combustion;

means for extracting energy from combustion gases, the means for pressurizing air and the means for extracting energy being coupled for synchronous rotation; and continuously variable transmission means coupled to the means for extracting energy, for transmitting power to a propulsion means.

In a third aspect, there is provided a method for varying the rotational speed of a propulsion load on a gas turbine aircraft engine comprising the steps of:

a) providing a compressor and a turbine rotating at a common rotational speed;

b) transmitting rotational movement from the turbine to the propulsion load; and c) continuously varying a rotational speed of the propulsion load in relation to the common rotational speed of the turbine and compressor.

Further details of these and other aspects will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
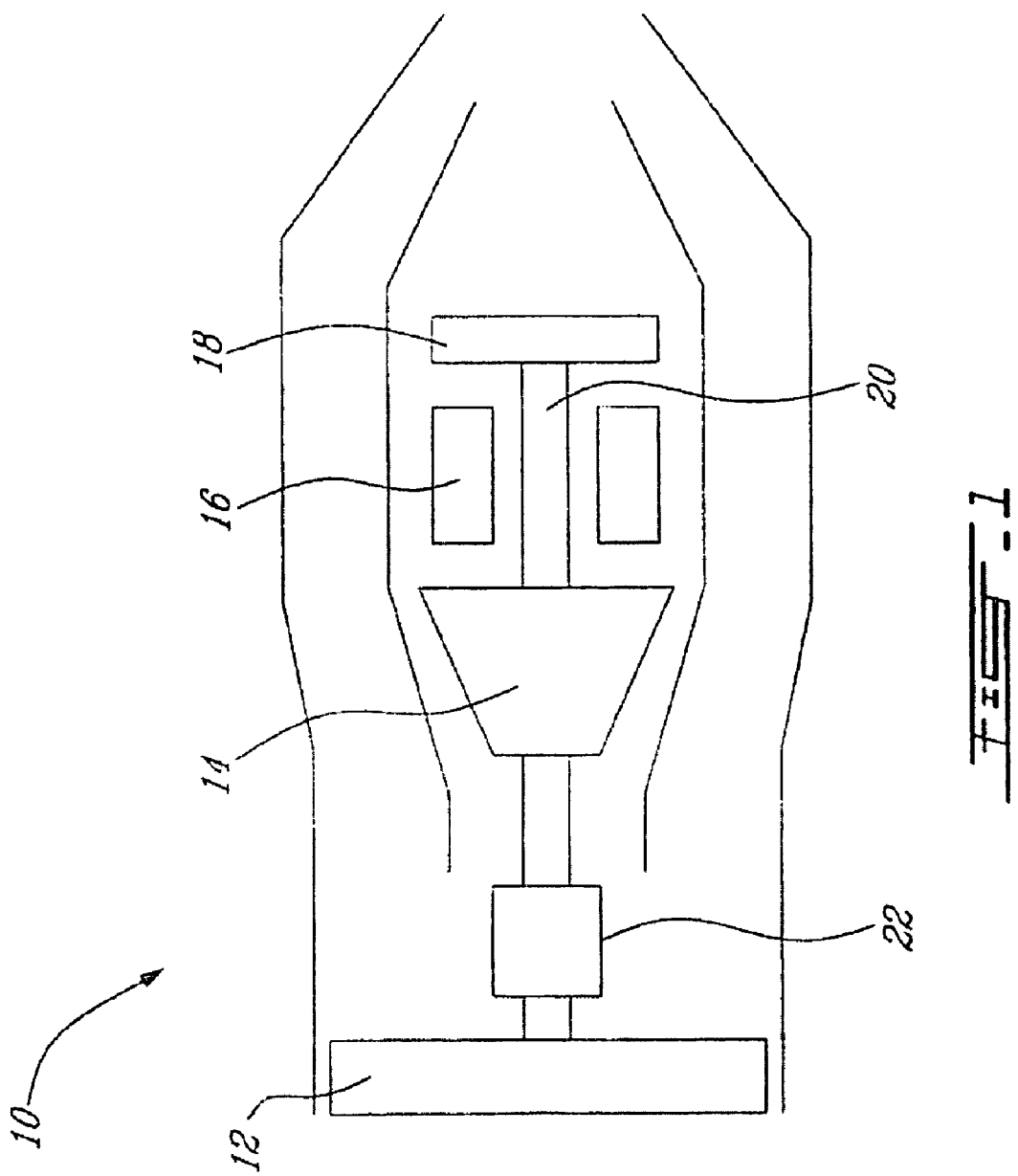
FIG. 1 is a schematic axial cross-section of a gas turbine aircraft engine according to a first embodiment.
Figure 2:
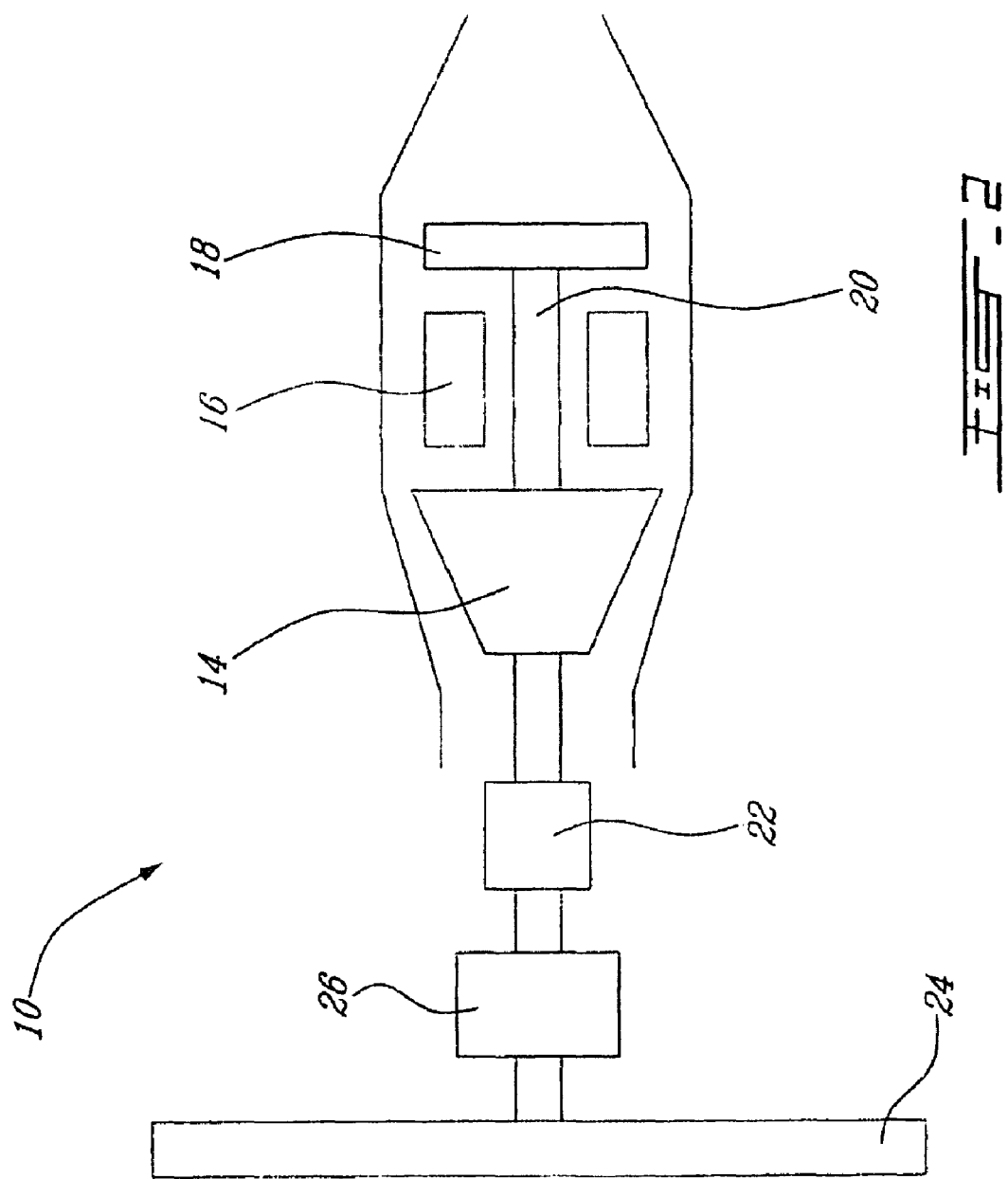
FIG. 2 is a schematic axial cross-section of a gas turbine aircraft engine according to a second embodiment.

FIGS. 1 and 2 illustrate two embodiments of a single spool gas turbine aircraft engine, generally shown at 10 preferably provided for use in subsonic flight.

The gas turbine engine 10 shown in FIG. 1, generally comprises in serial flow communication a fan 12 through which ambient air is propelled, a compressor 14 for pressurizing the air, a combustor 16 in which the compressed air is mixed with fuel and ignited for generating an annular stream of hot combustion gases, and a turbine 18 for extracting energy from the combustion gases. The compressor 14 and the turbine 18 are mounted to a common shaft 20 and therefore rotate synchronously. The fan 12 is coupled to the shaft 20 via a continuously variable transmission (CVT) 22 disposed upstream of the compressor 14.

The gas turbine engine 10 shown in FIG. 2 does not comprise a fan. Instead, a propeller 24 is coupled to the gas turbine engine 10. In addition to the CVT 22, the propeller 24 is coupled to the shaft 20 via a reduction gear box 26. The gear box 26 is used to step down the rotation speed of the propulsion load in relation to the shaft 20. The CVT 22 is disposed adjacent to the input of the gear box 26.

Figure 3:
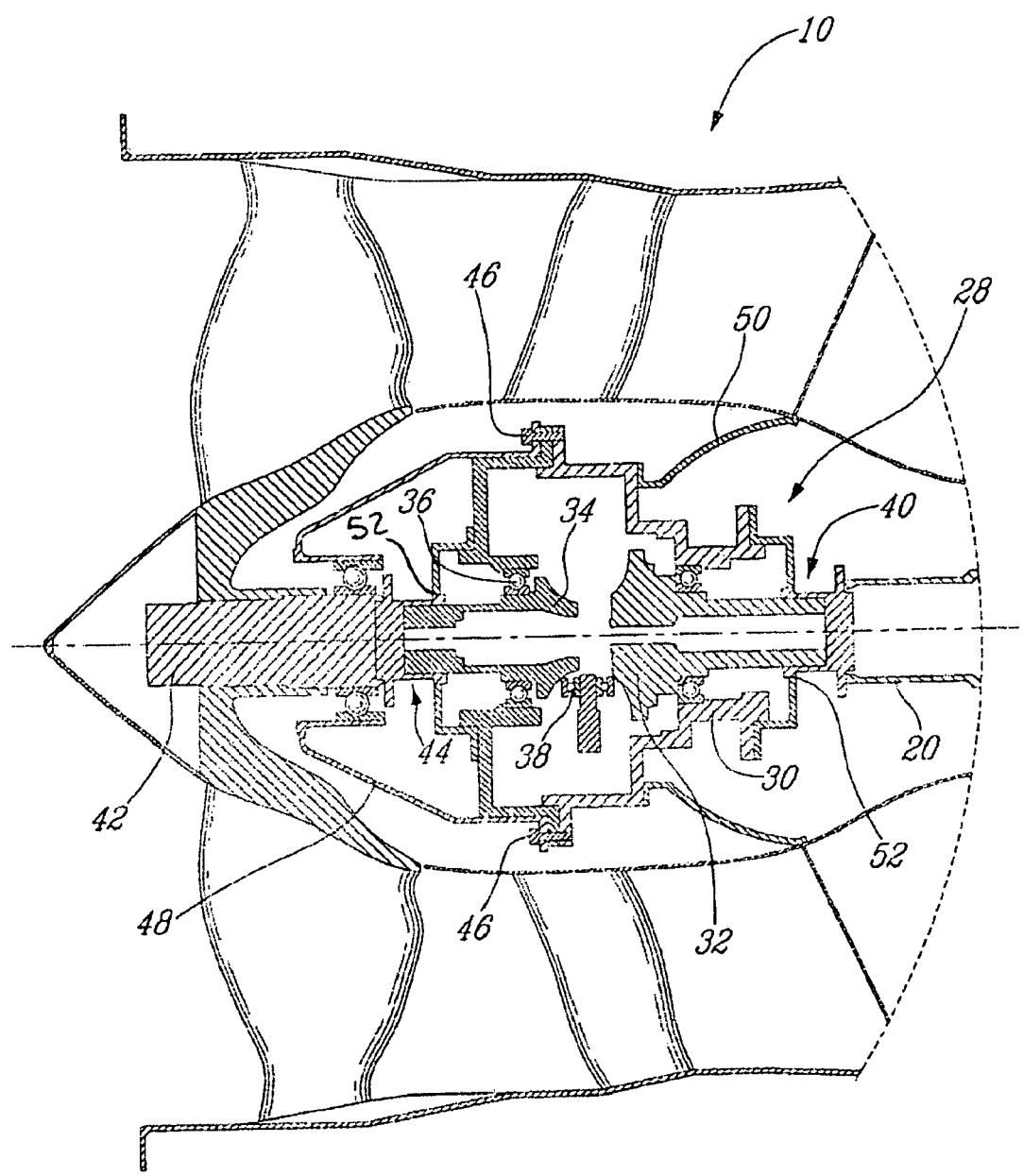
FIG. 3 is a partial axial cross-section of a turbofan gas turbine aircraft engine comprising a continuously variable transmission of toroidal type.

FIG. 3 illustrates the installation of CVT of conventional toroidal type, generally shown at 28, in the gas turbine engine 10 of FIG. 1. The toroidal CVT 28 comprises a housing 30 in which an input toroidal disk 32 and an output toroidal disk 34 are rotatably supported via bearings 38. The housing 30 may comprise a plurality of sections that are secured together to form the complete housing 30. Engagement of the input and output toroidal disks 32 and 34 is established via rollers such as roller 38 shown in FIG. 3. Even though a single roller 38 is shown in FIG. 3, it is understood that as in conventional toroidal CVT's, two or more rollers circumferentially spaced about the toroidal disks 32 and 34 are typically used. The toroidal CVT 28 also comprises a roller positioning mechanism which is not shown.

The input toroidal disk 32 is coupled to the shaft 20 via an input coupling generally shown at 40 and the output toroidal disk 34 is coupled to the fan 12 via a fan shaft 42 and an output coupling generally shown at 44. The input coupling 40 and the output coupling 44 may comprise suitable means such as key and key way arrangement, splined connection or the like. Proper selection of a suitable coupling means would be apparent to one skilled in the art.

Within the gas turbine engine 10, the toroidal CVT 28 is secured to a stationary portion of the gas turbine engine 10 such as the engine case. In the exemplary embodiment shown in FIG. 3, the housing 30 is secured to the engine case about the periphery of the housing 30 via interface 46 using threaded fasteners. Evidently, other suitable fastening means could also be used. Interface 46 is also used for securing a conventional bearing support 48. At an axial distance from interface 46, an additional support 50 may also be used to secure the housing 30 of the toroidal CVT 28 within the gas turbine engine 10.

The housing 30 provides a substantially scaled environment for the internal components of the toroidal CVT 28 in order to sustain proper operation of the toroidal CVT 28. Accordingly, suitable seals 52 are provided between the housing 30 and the shaft 20 and also between the housing 30 and the fan shaft 42. The housing 30 also provides a rigid support for rotatably supporting the input toroidal disk 32 and the output toroidal disk 34.

During operation, the compressor 14 and the turbine 18 rotate at a common rotational speed and the shaft 20 extending axially upstream from the compressor 14 drives a propulsion load. The propulsion load may comprise the fan 12, the propeller 24, a propfan (not shown) or the like.

The CVT 22 allows the rotational speed of the propulsion load to be continuously varied in relation to the common rotational speed of the compressor 14 and turbine 18. Accordingly, the rotational speed of the propulsion load can be varied while keeping a relatively constant rotational speed of the compressor 14 and turbine 18. This allows the gas turbine engine 10 to constantly be operated at its most efficient condition. The use of the CVT 22 allows for the fan 12 or propeller 14 to have a wider range of operating speed than what is available by varying the rotational speed of the compressor 14 and turbine 18. The CVT 22 may also serve to reduced the power required during start-up of the gas turbine engine 10. The speed variations of the CVT 22 can be synchronized with the throttle (not shown) of the gas turbine engine 10 and the synchronization can be achieved through the use of an engine electronic control system (not shown) of the gas turbine engine 10.

Using the toroidal CVT 28 shown in FIG. 3, the rotational speed of the fan shaft 42 is varied by altering the position of the rollers 38 using the roller positioning mechanism (not shown) as is the case with conventional toroidal CVT's.

Other types of CVT's besides the toroidal type may also be suitable for use in the gas turbine aircraft engine 10. Several considerations should be taken into account when integrating a CVT into an aircraft gas turbine engine. For example the envelope in which the CVT 22 must be installed is relatively small and therefore the CVT 22 should be configured to obtain a maximum power transfer capacity within a minimum envelope. The weight of the CVT 22 should be minimized for obvious reasons. Precautions should also be taken to maintain the CVT 22 within an acceptable temperature range. Depending on the type and location of the CVT 22 within the gas turbine engine 10, proper housing and heat shielding of the CVT may also be required. Further, any vibrations induced within the CVT 22 or transferred to the CVT 22 should be minimized to ensure proper operation and life of the CVT 22. Depending on the architecture of the particular engine, it may also be possible to retrofit an existing engine with a CVT.

The above description is meant to be exemplary only, and one skilled in the art will recognize that changes may be made to the embodiments described without departing from the scope of the invention disclosed. For example, the CVT 22 may be used on other configurations of gas turbine aircraft engines 10, that would also benefit from the advantages provided by the CVT 22. In reference to FIG. 2, the CVT 22 is disposed adjacent to the input of the reduction gear box 26, however, it is apparent that alternatively, the CVT 22 could also be located adjacent to the output of the reduction gear box 26. Still other modifications which fall within the scope of the present invention will be apparent to those skilled in the art, in light of a review of this disclosure, and such modifications are intended to fall within the appended claims.

What is claimed is:

1. A gas turbine aircraft engine with power variability comprising:
   an engine case;
   a single spool comprising a compressor and a turbine mounted on a common shaft inside the engine case;
   a propulsion load selected from a group comprising of: a fan and a propeller; and
   a continuously variable transmission provided between the single spool and the propulsion load, the continuously variable transmission being coupled to the shaft within the engine case for transmitting power to the propulsion load, the continuously variable transmission being operable to vary the speed of the propulsion load relative to the speed of the single spool, the continuously variable transmission having a housing structurally mounted to the engine case, the housing having a mounting interface for a bearing support supporting the propulsion load.

2. The gas turbine aircraft engine as defined in claim 1, wherein the continuously variable transmission is of toroidal type.

3. The gas turbine aircraft engine as defined in claim 1, further comprising a gear box coupled to the shaft for transmitting power from the shaft to the propulsion load.

4. The gas turbine aircraft engine as defined in claim 3, wherein the continuously variable transmission is disposed adjacent to an input of the gearbox.

5. The gas turbine aircraft engine as defined in claim 3, wherein the continuously variable transmission is disposed adjacent to an output of the gearbox.

6. The gas turbine aircraft engine defined in claim 1, wherein the engine is a turbofan or a turbopropeller.

7. A single spool gas turbine aircraft engine comprising:
   a single spool including means for pressurizing air for combustion, and means for extracting energy from combustion gases, the means for pressurizing air and the means for extracting energy being coupled for synchronous rotation;
   a fan or a propeller driven by said means for extracting energy; and
   continuously variable transmission means coupling the single spool to the fan or the propeller, said continuously variable transmission means being synchronize to a throttle of the engine via an engine electronic control system.

8. The gas turbine aircraft engine as defined in claim 7, wherein the continuously variable transmission means is of toroidal type.

9. The gas turbine aircraft engine as defined in claim 7, further comprising a speed reduction means between the means for extracting energy and the fan or the propeller.

10. The gas turbine aircraft engine as defined in claim 7, further comprising a means for coupling the fan or the propeller to the means for extracting energy.

11. A method for varying the rotational speed of a fan or propeller on a single spool gas turbine aircraft engine comprising the steps of:
   a) providing the engine with a single spool comprising a compressor and a turbine mounted on a common shaft and rotating therewith at a common rotational speed;
   b) transmitting rotational movement from the turbine to the fan or the propeller; and
   c) continuously varying a rotational speed of the fan or the propeller in relation to the common rotational speed of the turbine and compressor and as a function of the engine throttle.

12. The method as defined in claim 11, further comprises stepping down the rotational speed of the fan or the propeller in relation to the common rotation speed of the turbine and compressor.

* * * * *